(12) United States Patent
Barbalho et al.

(10) Patent No.: US 11,379,313 B2
(45) Date of Patent: Jul. 5, 2022

(54) EFFICIENT METHOD FOR GENERATING ASSET BACKUP SCHEDULING PLANS

(71) Applicant: EMC IP Holding Company LLC, Hopkinton, MA (US)

(72) Inventors: Hugo De Oliveira Barbalho, Rio de Janeiro (BR); Tiago Salviano Calmon, Rio de Janeiro (BR); Eduardo Vera Sousa, Niterói (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 31 days.

(21) Appl. No.: 17/107,728

(22) Filed: Nov. 30, 2020

(65) Prior Publication Data

US 2022/0171680 A1 Jun. 2, 2022

(51) Int. Cl.
*G06F 12/00* (2006.01)
*G06F 11/14* (2006.01)

(52) U.S. Cl.
CPC ...... *G06F 11/1461* (2013.01); *G06F 11/1451* (2013.01); *G06F 11/1464* (2013.01); *G06F 11/1469* (2013.01)

(58) Field of Classification Search
CPC ............. G06F 11/1461; G06F 11/1451; G06F 11/1464; G06F 11/1469
See application file for complete search history.

(56) References Cited

U.S. PATENT DOCUMENTS

| 10,235,250 B1* | 3/2019 | Ambastha ........... G06F 11/2094 |
| 2014/0351221 A1* | 11/2014 | Flowers .............. G06F 11/1448 |
| | | 707/654 |

OTHER PUBLICATIONS

"Data Protection Market is Anticipated to Grow US$ 120 Billion By 2023", Data Protection Market, MarketWatch, Jan. 16, 2019 (4 pages).
Cherkasova, L., "Enhancing and optimizing a data protection solution", HP Laboratories, IEEE Oct. 2002 (12 pages).
Cherkasova, L., "DP+IP = design of efficient backup scheduling", HP Laboratories, Published in the Proceedings of the 5th International Conference on Network and Service Management Oct. 2010 (10 pages).
Cherkasova, Ludmila et al., "DP+IP = Design of Efficient Backup Scheduling", IEEE Jan. 17, 2011 (8 pages).

(Continued)

*Primary Examiner* — John A Lane
(74) *Attorney, Agent, or Firm* — Chamberlain, Hrdlicka, White, Williams & Aughtry

(57) ABSTRACT

An efficient method for generating asset backup scheduling plans. Within a data protection environment, at least two service level metrics may be observed—a recovery point object (RPO) and a recovery time objective (RTO). In order to meet acceptable values for these metrics, on par with established service level agreements, infrastructure employed throughout the data protection environment, as well as the scheduling of asset backup operations, tend to grow in complexity. To address service distributions potentially emerging from the aforementioned complexities, the disclosed method proposes a heuristic approach to generating asset backup scheduling plans, which consider factors such as backup device limitations, RPO violation minimization, asset usage, and asset prioritization.

20 Claims, 19 Drawing Sheets

(56) References Cited

OTHER PUBLICATIONS

Xia, Wen et al., "A Comprehensive Study of the Past, Present, and Future of Data Deduplication", vol. 104, No. 9, Sep. 2016 (30 pages).
Martello, S. et al., "Linear Assignment Problems" Annals of Discrete Mathematics 31 (1987) 259-282 (24 pages).
Reinsel, D., "Data Age 2025: The Evolution of Data to Life-Critical", An IDC White Paper, Apr. 2017 (25 pages).

* cited by examiner

EFFICIENT METHOD FOR GENERATING ASSET BACKUP SCHEDULING PLANS

BACKGROUND

Within a data protection environment, at least two service level metrics may be observed—a recovery point object (RPO) and a recovery time objective (RTO). These metrics reflect acceptable data loss from asset downtime and the amount of time needed to bring an asset back online, respectively.

SUMMARY

In general, in one aspect, the invention relates to a method for generating asset backup scheduling plans. The method includes selecting a backup device, identifying a set of assets assigned to the backup device, initializing a backup scheduling plan using scheduling state for each asset in the set of assets, generating a backup priority list including a number of entries matching a cardinality of the set of assets, while the backup priority list includes at least one entry, performing an iterative process, where the iterative process includes selecting, from at least a subset of the set of assets represented in the at least one entry, a target asset based on at least one backup priority specified in the backup priority list, identifying a set of backup scheduling options for the target asset, selecting, for the target asset, a best-fit backup scheduling option from the set of backup scheduling options, inserting the best-fit backup scheduling option for the target asset into, in order to update, the backup scheduling plan, and updating the backup priority list.

In general, in one aspect, the invention relates to a non-transitory computer readable medium (CRM). The non-transitory CRM includes computer readable program code, which when executed by a computer processor, enables the computer processor to select a backup device, identify a set of assets assigned to the backup device, initialize a backup scheduling plan using scheduling state for each asset in the set of assets, generate a backup priority list including a number of entries matching a cardinality of the set of assets, while the backup priority list includes at least one entry, perform an iterative process, where the iterative process includes selecting, from at least a subset of the set of assets represented in the at least one entry, a target asset based on at least one backup priority specified in the backup priority list, identifying a set of backup scheduling options for the target asset, selecting, for the target asset, a best-fit backup scheduling option from the set of backup scheduling options, inserting the best-fit backup scheduling option for the target asset into, in order to update, the backup scheduling plan, and updating the backup priority list.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4P, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to an efficient method for generating asset backup scheduling plans. Within a data protection environment, at least two service level metrics may be observed—a recovery point object (RPO) and a recovery time objective (RTO). In order to meet acceptable values for these metrics, on par with established service level agreements, infrastructure employed throughout the data protection environment, as well as the scheduling of asset backup operations, tend to grow in complexity. To address service distributions potentially emerging from the aforementioned complexities, the disclosed method proposes a heuristic approach to generating asset backup scheduling plans, which consider factors such as backup device limitations, RPO violation minimization, asset usage, and asset prioritization.

Figure 1:
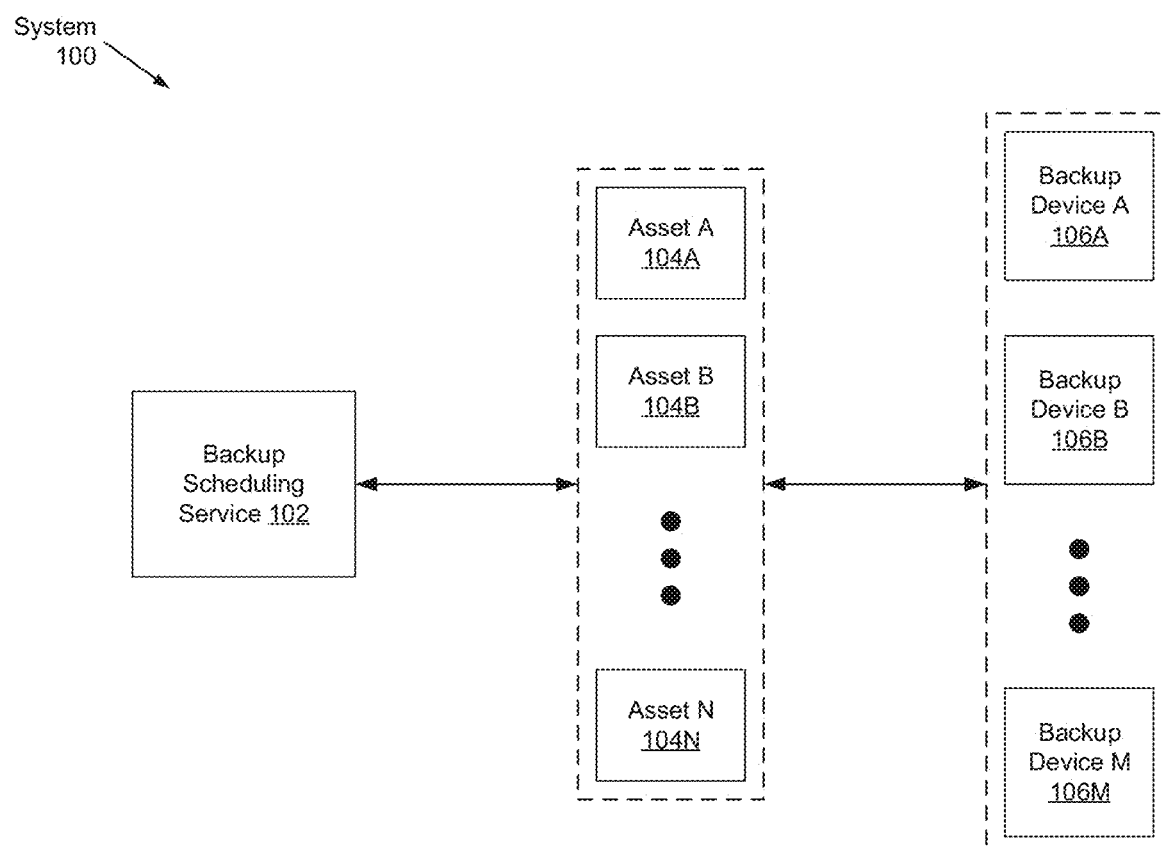
FIG. 1 shows a system in accordance with one or more embodiments of the invention.

FIG. 1 shows a system in accordance with one or more embodiments of the invention. The system (100) may include a backup scheduling service (102), a set of one or more assets (104A-104N), and a set of one or more backup devices (106A-106M). Each of these system (100) components is described below.

In one embodiment of the invention, the backup scheduling service (102) may represent any back-end information technology (IT) infrastructure designed and configured for intelligent and efficient backup scheduling plan generation targeting any subset of the set of assets (104A-104N). To that extent, the backup scheduling service (102) may include functionality to perform the method described in FIG. 2, below. Further, the backup scheduling service (102) may be implemented using one or more servers (not shown). Each server may represent a physical or virtual server, which may reside in a datacenter or a cloud computing environment. Alternatively or additionally, the backup scheduling service (102) may be implemented using one or more computing systems similar to the exemplary computing system shown in FIG. 3. One of ordinary skill will appreciate that the backup scheduling service (102) may perform other functionalities without departing from the scope of the invention.

In one embodiment of the invention, an asset (104A-104N) may represent a database, or a logical container, whereto and wherefrom data may be stored and retrieved, respectively. An asset (104A-104N) may occupy a portion of a physical storage device (not shown) (described below) or, alternatively, may span across multiple physical storage devices. In turn, the asset (104A-104N) inhabited storage device(s) may reside and operate within a purpose-identified standalone device (e.g., external hard disk, network attached storage, etc.) or, alternatively, may reside and operate as part of a larger computing system (e.g., a desktop computer, a server, a mainframe, etc.). Furthermore, an asset (104A-104N) may maintain one or various data format(s) thereon, including, but not limited to, image-formatted data, text-formatted data, video-formatted data, audio-formatted data, machine code data, any other form of computer readable content, or any combination thereof.

In one embodiment of the invention, a physical storage device (mentioned above) may encompass non-transitory computer readable storage media on which data may be stored in whole or in part, and temporarily or permanently. Further, a physical storage device may be implemented based on any existing storage device technology—examples of which may include, but are not limited to, flash based storage technology, fibre-channel (FC) based storage technology, serial-attached small computer system interface (SCSI) (SAS) based storage technology, and serial advanced technology attachment (SATA) storage technology. Further, any subset or all of a physical storage device may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a backup device (106A-106M) may represent a data backup, archiving, and/or disaster recovery storage system. To that extent, a backup device (106A-106M) may at least include functionality to receive and store copies of data from one or more assets (104A-104N) based on backup scheduling plans generated by the backup scheduling service (102). However, one of ordinary skill will appreciate that a backup device (106A-106M) may perform other functionalities without departing from the scope of the invention. Further, a backup device (106A-106M) may be implemented using one or more servers (not shown). Each server may represent a physical or virtual server, which may reside in a datacenter or a cloud computing environment. Alternatively or additionally, a backup device (106A-106M) may be implemented using one or more computing systems similar to the exemplary computing system shown in FIG. 3.

In one embodiment of the invention, the above-mentioned system (100) components may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents or systems (e.g., network switches, network routers, network gateways, etc.) that may facilitate communications between any of the above-mentioned system (100) components. Moreover, the above-mentioned system (100) components may communicate with one another using any combination of wired and/or wireless communication protocols.

While FIG. 1 shows a configuration of components, other system (100) configurations may be used without departing from the scope of the invention.

Figure 2:
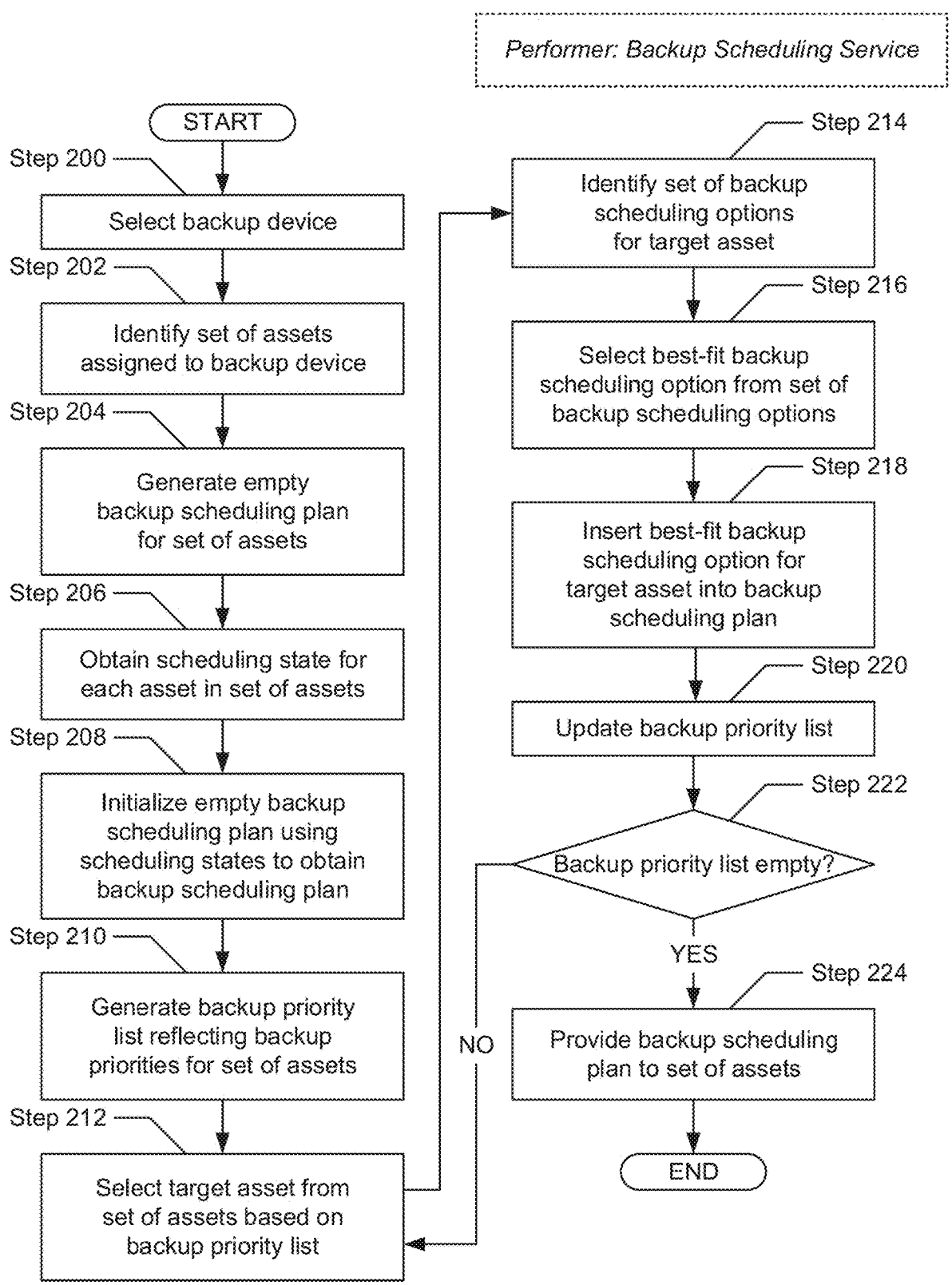
FIG. 2 shows a flowchart describing an efficient method for generating asset backup scheduling plans in accordance with one or more embodiments of the invention.

FIG. 2 shows a flowchart describing an efficient method for generating asset backup scheduling plans in accordance with one or more embodiments of the invention. The various steps outlined below may be performed by the backup scheduling service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a backup device is selected. In one embodiment of the invention, the backup device may be selected from a set of backup devices. Thereafter, in Step 202, a set of assets is identified, where each asset in the set of assets has been pre-assigned to the backup device (selected in Step 200). That is, in one embodiment of the invention, each asset in the set of assets may have been pre-configured to back-up their respective data to the backup device.

In Step 204, an empty backup scheduling plan, for the set of assets (identified in Step 202), is generated. In one embodiment of the invention, a backup scheduling plan may refer to a scheme that establishes time frames (or slots) for backing up asset data to a designated backup device. An empty backup scheduling plan may, accordingly, refer to the skeleton framework for a backup scheduling plan, which may, for example, resemble an empty table or matrix (see e.g., FIG. 4B). Information needed to generate the empty backup scheduling plan may include, but is not limited to: a fixed backup window size (for a fixed backup window) reflecting a number of time frames/slots that the backup scheduling plan (or fixed backup window) spans; and a cardinality of the set of assets.

In Step 206, scheduling state, for each asset in the set of assets (identified in Step 202), is obtained. In one embodiment of the invention, the obtained scheduling state for a given asset may include, but is not limited to: a set of one or more forbidden time frames/slots associated with the given asset, which may respectively indicate one or more periods of time (throughout the fixed backup window) during which performing a backup operation targeting the given asset may be undesirable (e.g., peak usage times); an expected length of time (measured in one or more consecutive time frames/slots) that a backup operation targeting the given asset would last (also referred to as an expected backup time); a maximum length of time (measured in one or more consecutive time frames/slots) to wait following a previous backup operation, until triggering a subsequent backup operation, targeting the given asset (also referred to as a next backup period); and an initial deadline (reflective of a given time frame/slot positioned early in the fixed backup window) for performing a backup operation targeting the given asset.

In Step 208, the empty backup scheduling plan (generated in Step 204) is initialized using at least a portion of the scheduling states (obtained in Step 206). That is, in one embodiment of the invention, the empty backup scheduling plan (see e.g., FIG. 4B) may be updated to reflect: the above-mentioned forbidden time frame(s)/slot(s) (see e.g., FIG. 4C) for the set of assets (identified in Step 202); a set of one or more tentative start time frames/slots (see e.g., FIG. 4D) for the set of assets, which may be derived using the above-mentioned expected backup times; and the above-mentioned initial deadlines (see e.g., FIG. 4E) for the set of assets.

In one embodiment of the invention, an above-mentioned tentative start time frame/slot, for a given asset, may refer to a lead available time frame/slot (i.e., a first non-forbidden time frame/slot in a set of consecutive, non-forbidden time frames/slots) that marks a possible trigger time for performing a backup operation targeting the given asset. The cardinality of the set of consecutive, non-forbidden time frames/slots, which a tentative start time frame/slot leads, must match or exceed the expected backup time for the given asset. Accordingly, a tentative start time frame/slot may mark a possible time frame/slot, along the fixed backup window, that a backup operation may be scheduled for a given asset.

In Step 210, a backup priority list is generated. In one embodiment of the invention, the backup priority list may refer to a data structure (e.g., table), which may include zero or more entries. Each entry (if any) may present a derived priority value mapped to an asset of the set of assets (identified in Step 202). The priority value (also referred to as the backup priority) for a given asset may measure the urgency for scheduling a backup operation targeting the given asset. Accordingly, backup scheduling precedence may be awarded to the asset mapped to the highest backup priority (over other backup priorities mapped to other assets) at any given point-in-time. Furthermore, the backup priority for any asset may be derived using the following expression:

$$\text{Priority} = \sum_{i=1}^{k} (i^{th}\ TentativeStartSlot - DealineSlot)$$

where k refers to the number of tentative start time frames/slots, pertaining to the asset, that need to be considered in deriving the backup priority.

In Step 212, from the set of assets (identified in Step 202), a target asset is selected based on the backup priority list (generated in Step 210). Specifically, in one embodiment of the invention, a singular asset with the highest backup priority may be selected as the target asset. Should two or more assets have the highest backup priority, selection of the target asset (amongst the two or more assets) may be determined based on an asset criticality associated with the assets. That is, for example, if an Asset A and an Asset C both map to a highest backup priority, however, the criticality of Asset A is higher than the criticality of Asset C, then Asset A may be selected as the target asset. Conversely, if the criticality of Asset C is higher than the criticality of Asset A, then alternatively, Asset C may be selected as the target asset. Substantively, asset criticality of an asset may measure the importance of the asset and/or the data associated therewith, and may be conveyed through any existing numerical or categorical mapping. Asset criticality may also be employed as a factor in deriving the backup priority of an asset. Moreover, should ties between two or more assets persist, other criteria may be considered to eventually select a singular asset as the target asset.

In Step 214, a set of backup scheduling options, for the target asset (selected in Step 212), is identified. In one embodiment of the invention, each backup scheduling option may refer to an opening in the backup scheduling plan, which could accommodate the scheduling of a possible backup operation entailing data from the target asset. Further, each backup scheduling option may be defined through: (a) a start time frame/slot (i.e., one of the tentative start time frames/slots for the target asset used to, at least in part, initialize the empty backup scheduling plan (in Step 208)) indicating a particular time frame/slot during which the possible backup operation would be scheduled to trigger; (b) a stream identifier belonging to one of the one or more incoming data streams (purposed for supporting backup operations), which may be available on and handled by the backup device (selected in Step 200); and (c) a backup penalty or violation value representing the number of time frames/slots that the aforementioned start time frame/slot may be beyond (or after) the deadline time frame/slot for the target asset.

In Step 216, from the set of backup scheduling options (identified in Step 214), a best-fit backup scheduling option is selected. In one embodiment of the invention, the best-fit backup scheduling option may be the backup scheduling option, in the set of backup scheduling options, associated with the lowest backup penalty or violation value. Should two or more backup scheduling options have the lowest backup penalty/violation value, status of the best-fit backup scheduling option (amongst the two or more backup scheduling options) may be awarded to the backup scheduling option defined by the latest start time frame/slot. Furthermore, should ties between two or more backup scheduling options persist, other criteria may be considered to eventually select a singular backup scheduling option as the best-fit backup scheduling option.

In Step 218, the best-fit backup scheduling option (selected in Step 216) is inserted into the backup scheduling plan. That is, in one embodiment of the invention, a backup operation targeting the target asset (selected in Step 212) may be scheduled during the opening in the backup schedule plan representative of the best-fit backup scheduling option.

In Step 220, the backup priority list (generated in Step 210, or updated in a previous iteration of Step 220) is updated. Specifically, in one embodiment of the invention, following the insertion of the best-fit backup scheduling option, the deadline, associated with the target asset (selected in Step 212), may be moved to a new time frame/slot relative to the start time frame/slot of the best-fit backup scheduling option and based on the next backup period associated with the target asset—i.e., new deadline=best-fit backup scheduling option start time frame/slot+next backup period. Based on the new deadline, the derived backup priority for the target asset may be updated to reflect a new value, which may also depend on any k (defined above) remaining tentative start time frames/slots for the target asset.

In one embodiment of the invention, other state reflected in the backup scheduling plan may or may not also be updated at this point. For example, one or more remaining tentative start time frames/slots, associated with any non-target asset in the set of assets (identified in Step 202), may be removed from consideration (see e.g., FIG. 4K, below). Removal of a given tentative start time frame/slot (associated with a non-target asset) may transpire should any previously scheduled backup operation(s) (for any other asset(s)) employ or occupy every incoming data stream of the backup device (selected in Step 200) during the set of consecutive, non-forbidden time frames/slots spanning the expected backup time for the non-target asset and lead by the given tentative start time frame/slot. Further, by removing one or more remaining tentative start time frames/slots for a given asset, the backup priority for that given asset may also be affected.

In Step 222, a determination is made as to whether the backup priority list (updated in Step 220) is empty, or includes zero entries. In one embodiment of the invention, if it is determined that the updated backup priority list includes zero entries, then the process proceeds to Step 224. On the other hand, in another embodiment of the invention, if it is alternatively determined that the updated backup priority list includes at least one entry, then the process alternatively proceeds to Step 212, where a target asset may again be selected based on the updated backup priority list.

In Step 224, following the determination (in Step 222) that the backup priority list (updated in Step 220) is empty (or includes zero entries), the backup scheduling plan is distributed to the set of assets (identified in Step 202). Specifically, in one embodiment of the invention, portions of the backup scheduling plan, respective to a given asset, may be provided to the given asset for implementation thereon. More specifically, the information provided to a given asset may include, but is not limited to, one or more scheduling information tuples representative, respectively, of one or more best-fit backup scheduling options selected (and inserted into the backup scheduling plan) for the given asset. Each scheduling information tuple may include, but is not limited to: a start time frame/slot used to, at least in part, define the best-fit backup scheduling option associated with the scheduling information tuple; and a stream identifier (of the one or more incoming data streams available on the backup device) used to, also at least in part, define the best-fit backup scheduling option associated with the scheduling information tuple.

Figure 3:
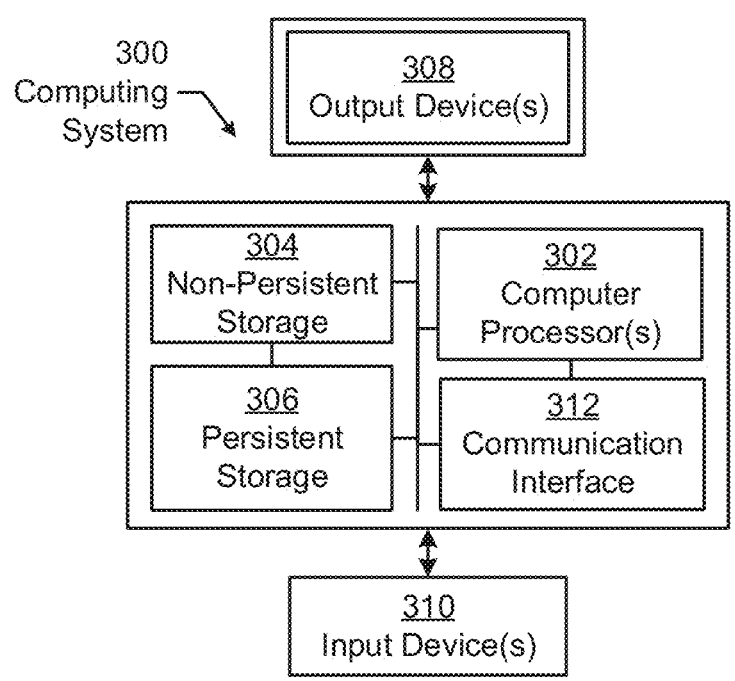
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4A:
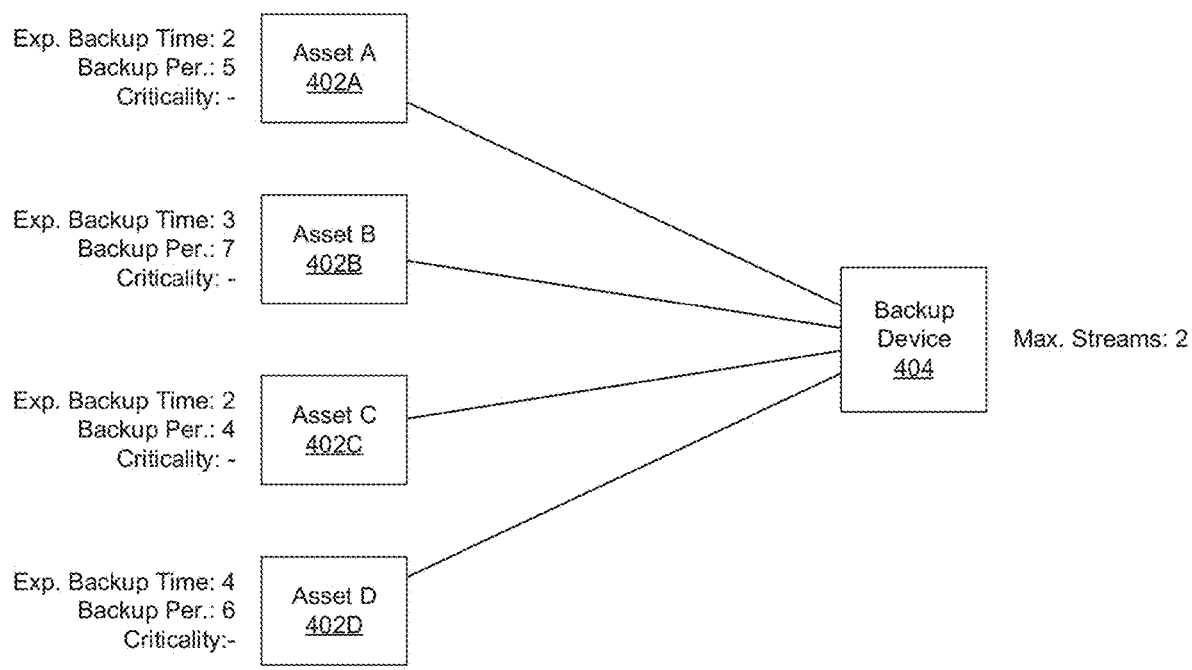
FIGS. 4A-4P show an exemplary scenario in accordance with one or more embodiments of the invention.
Figure 4B:
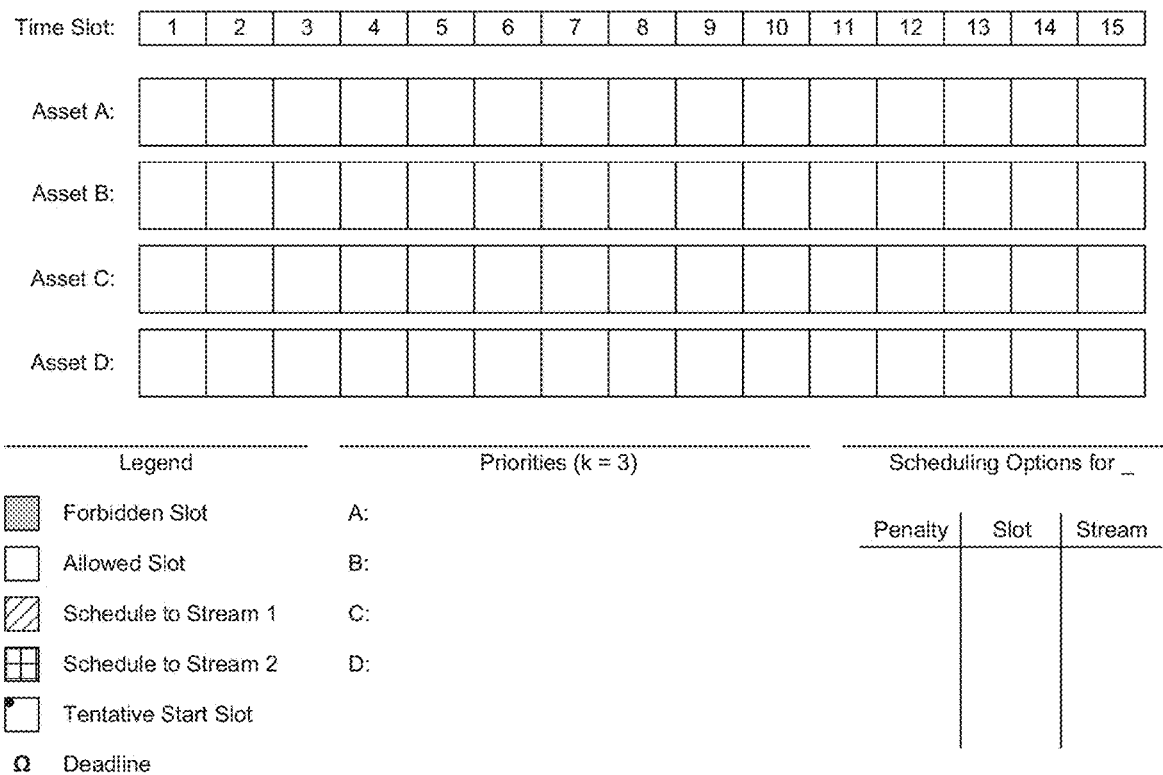
Figure 4C:
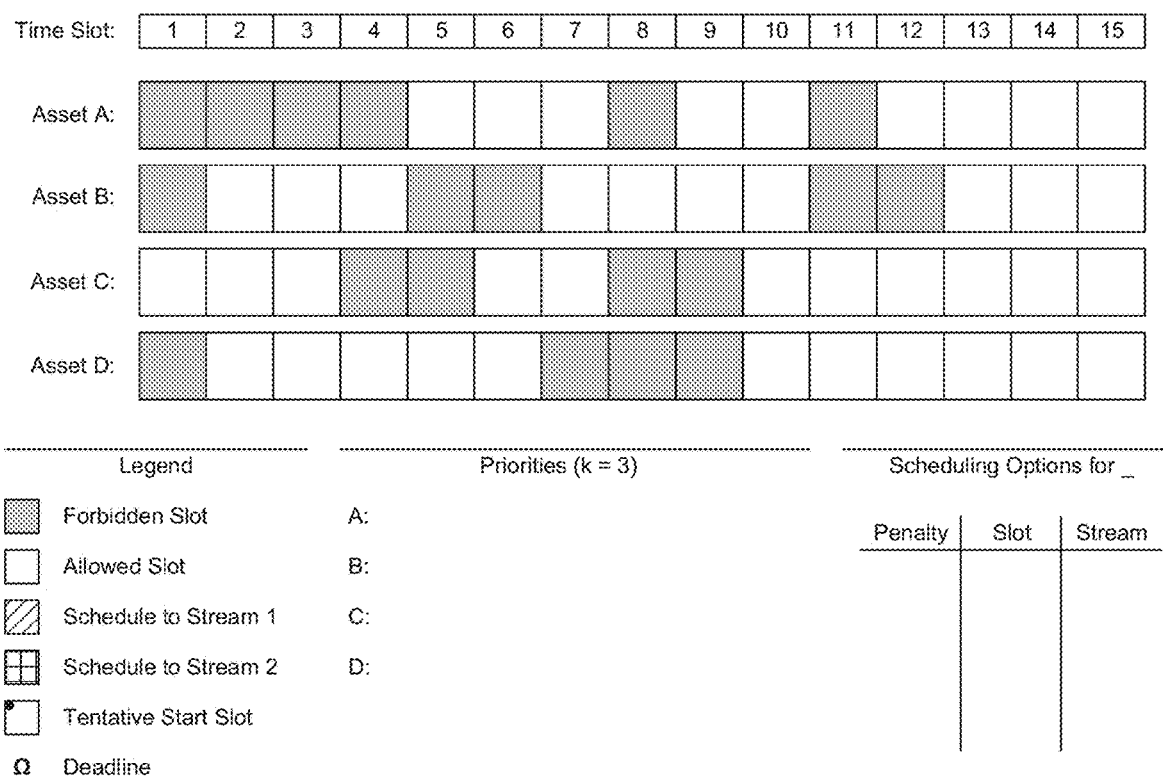
Figure 4D:
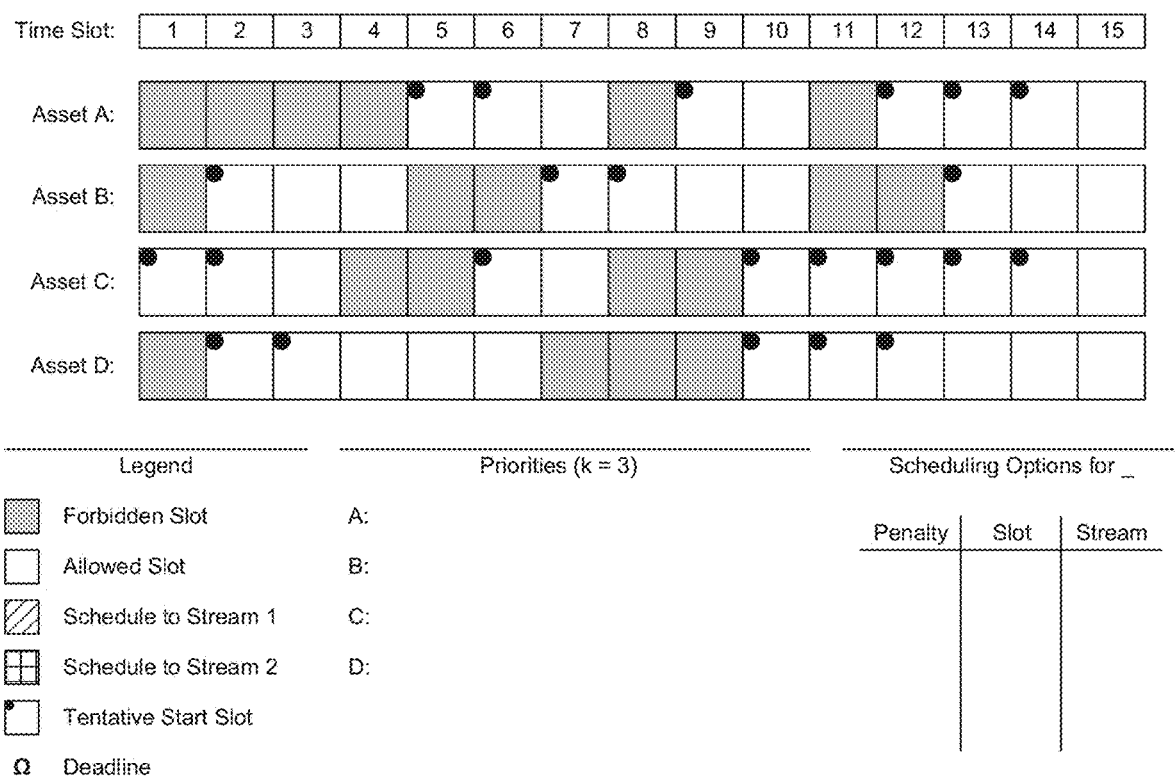
Figure 4E:
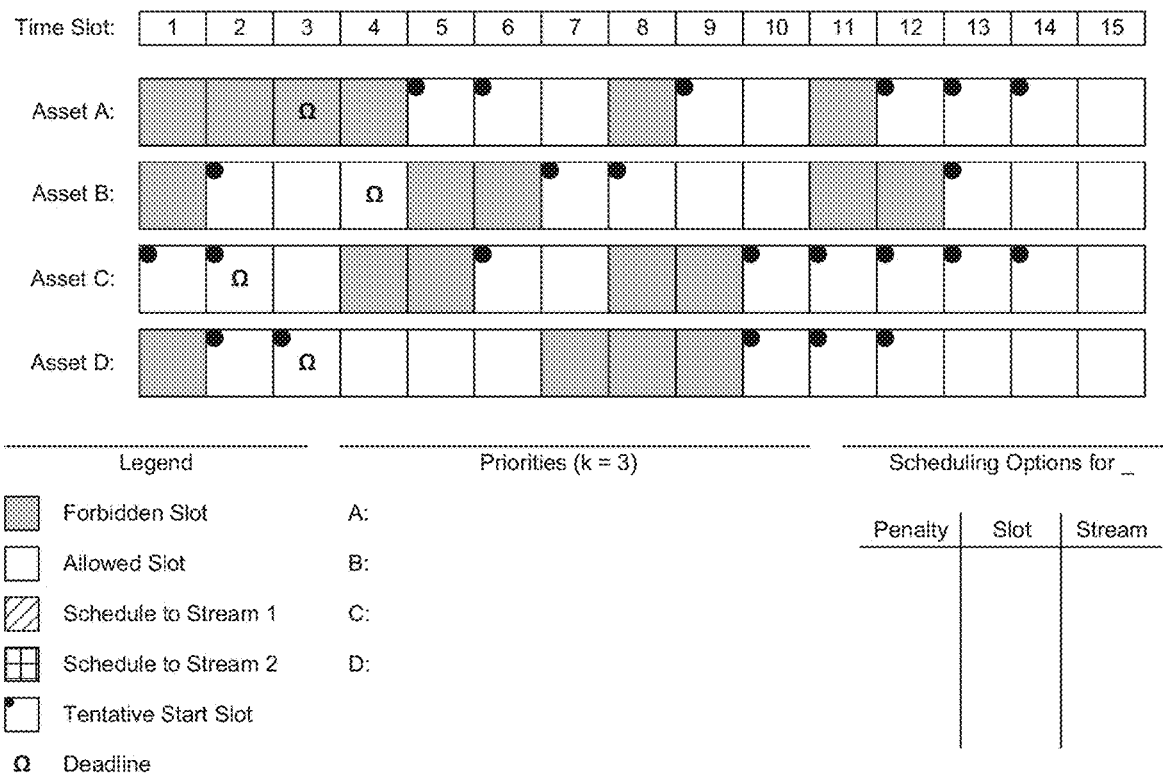
Figure 4F:
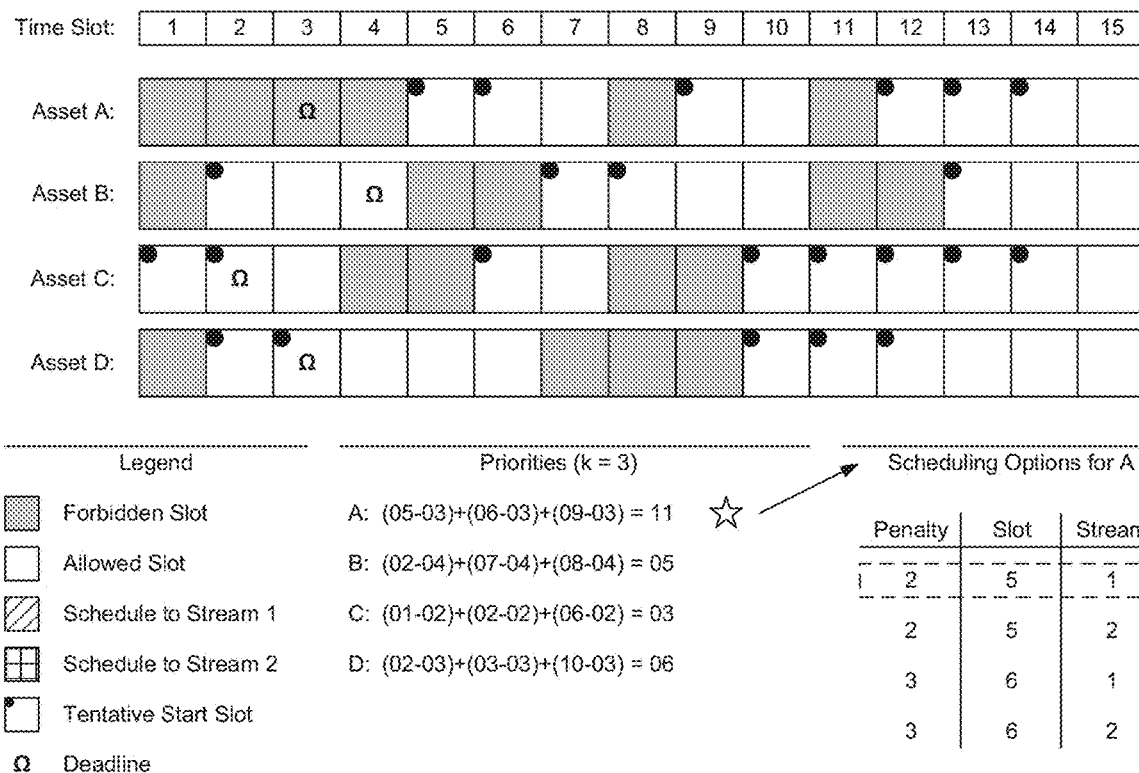
Figure 4G:
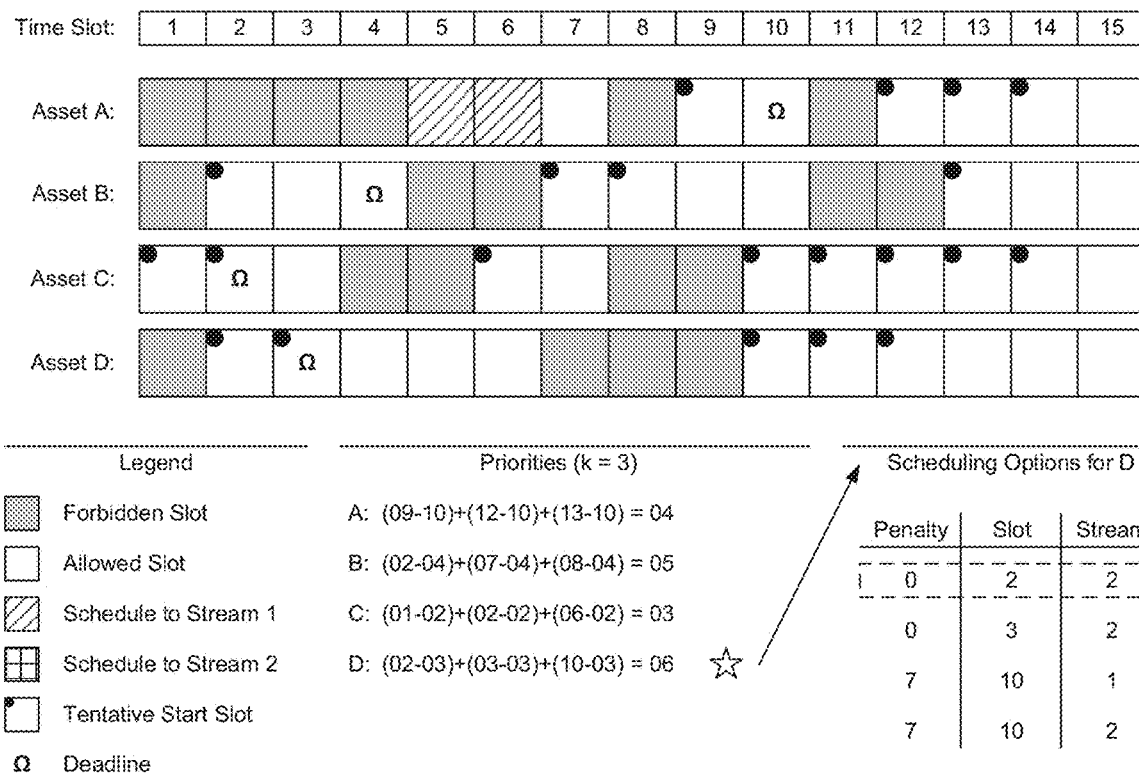
Figure 4H:
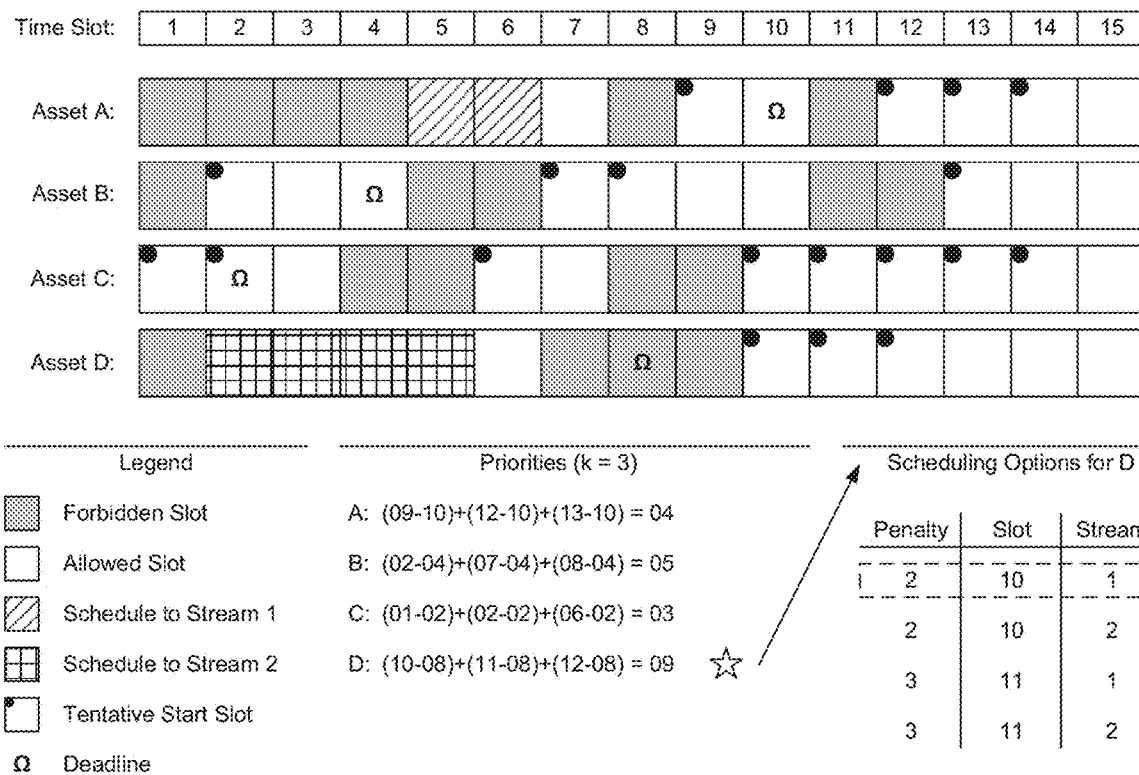
Figure 4I:
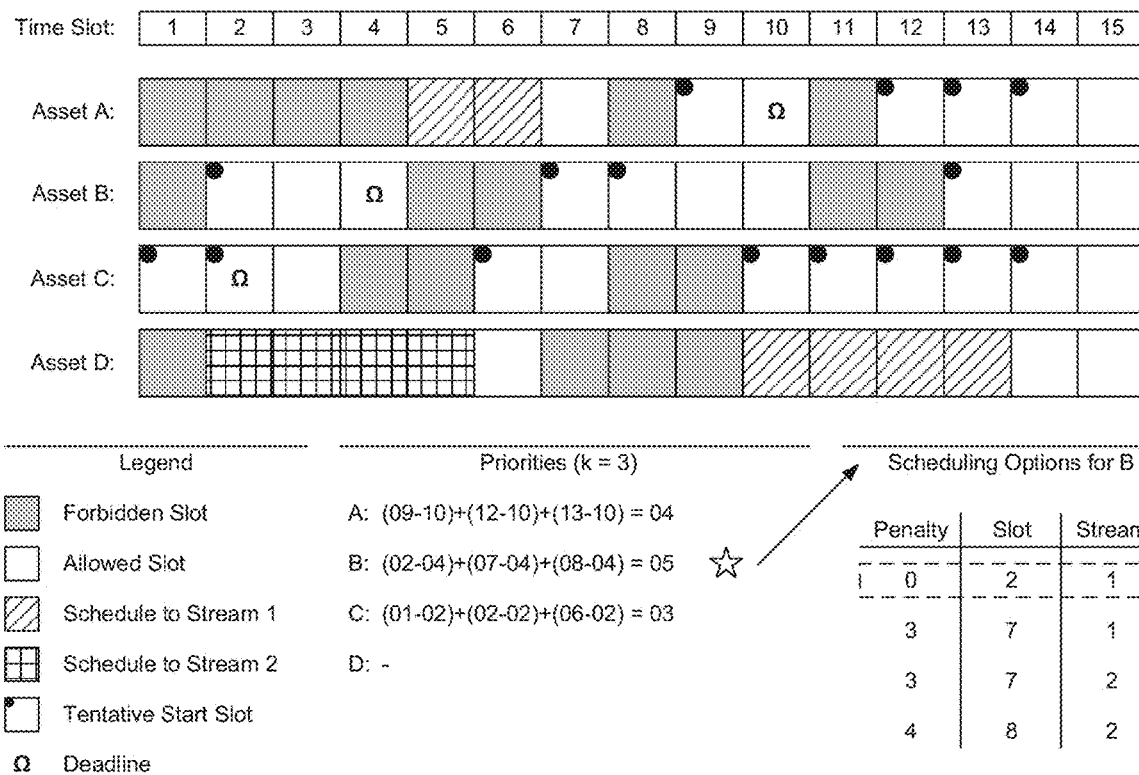
Figure 4J:
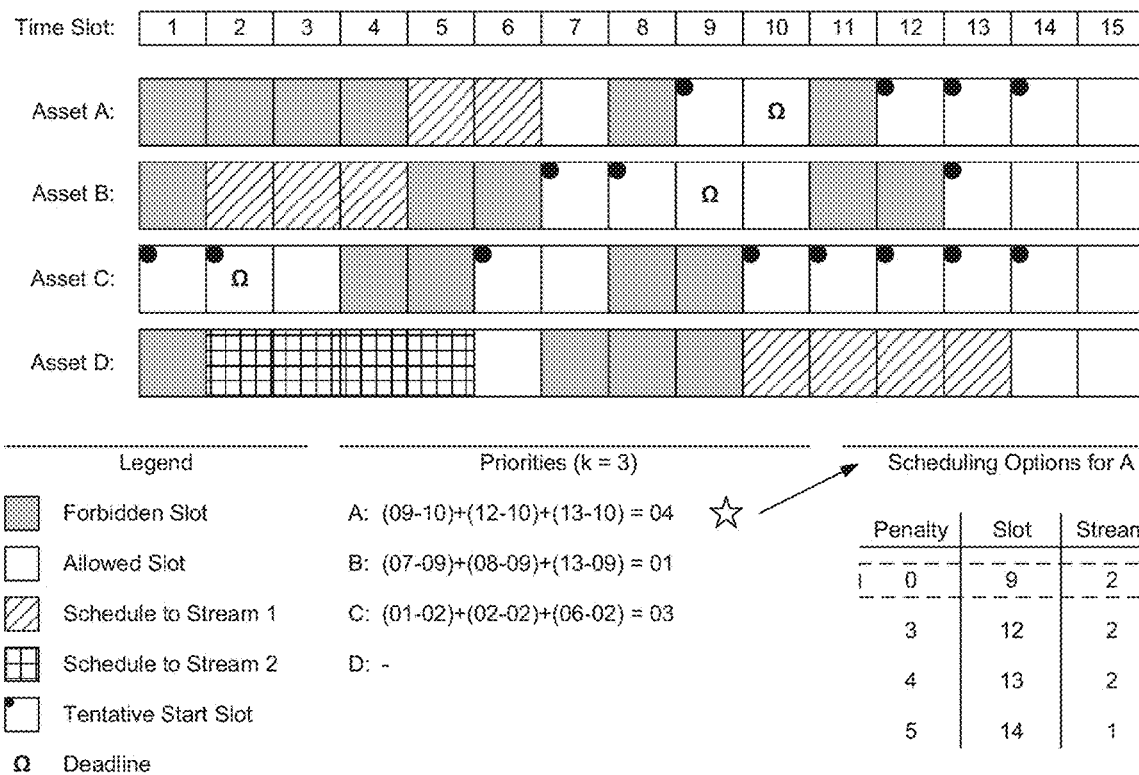
Figure 4K:
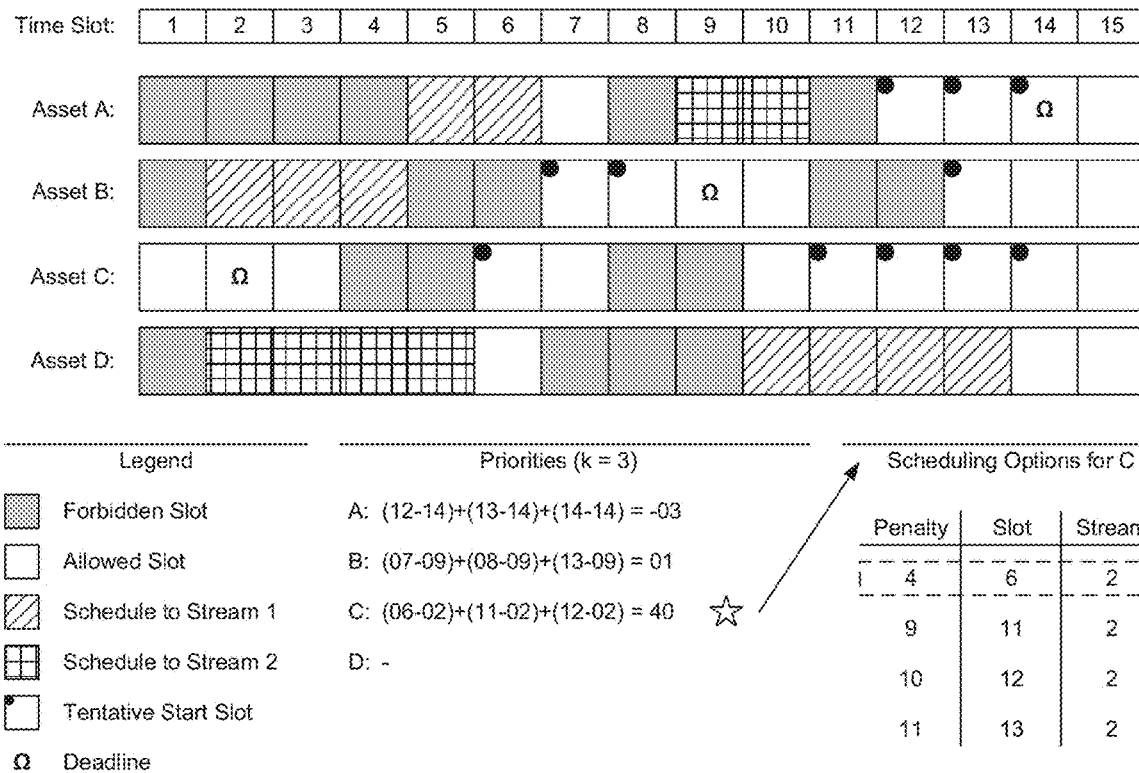
Figure 4L:
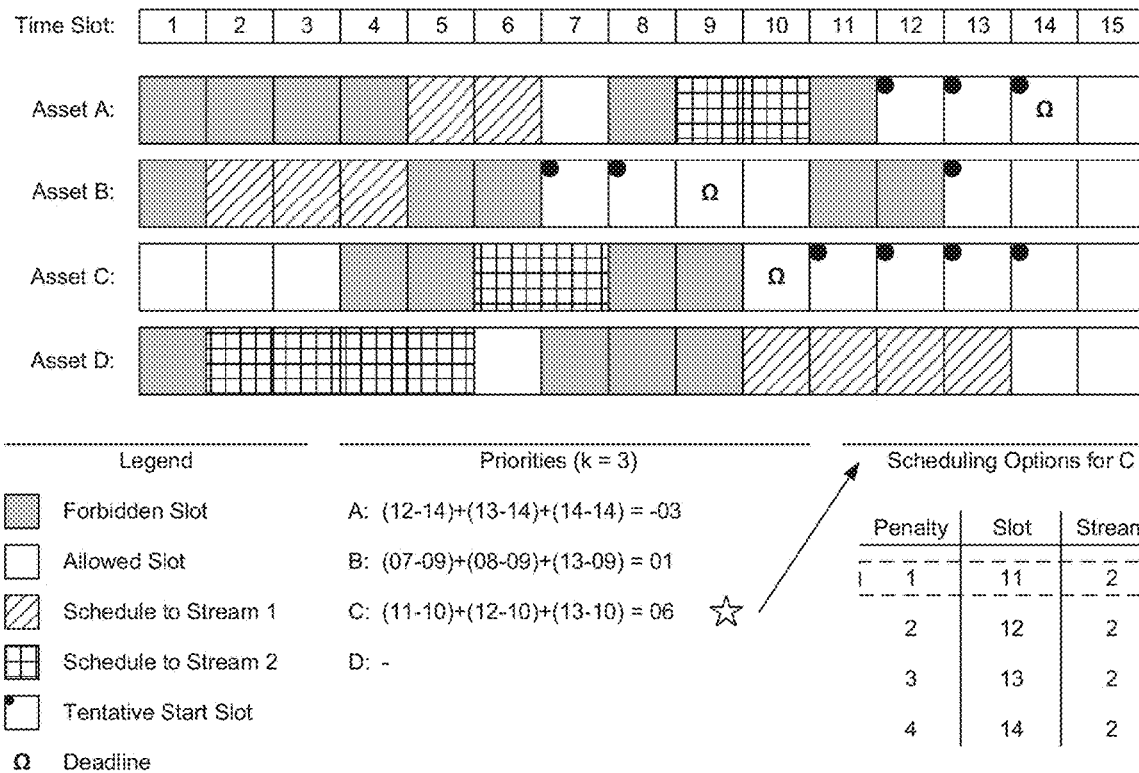
Figure 4M:
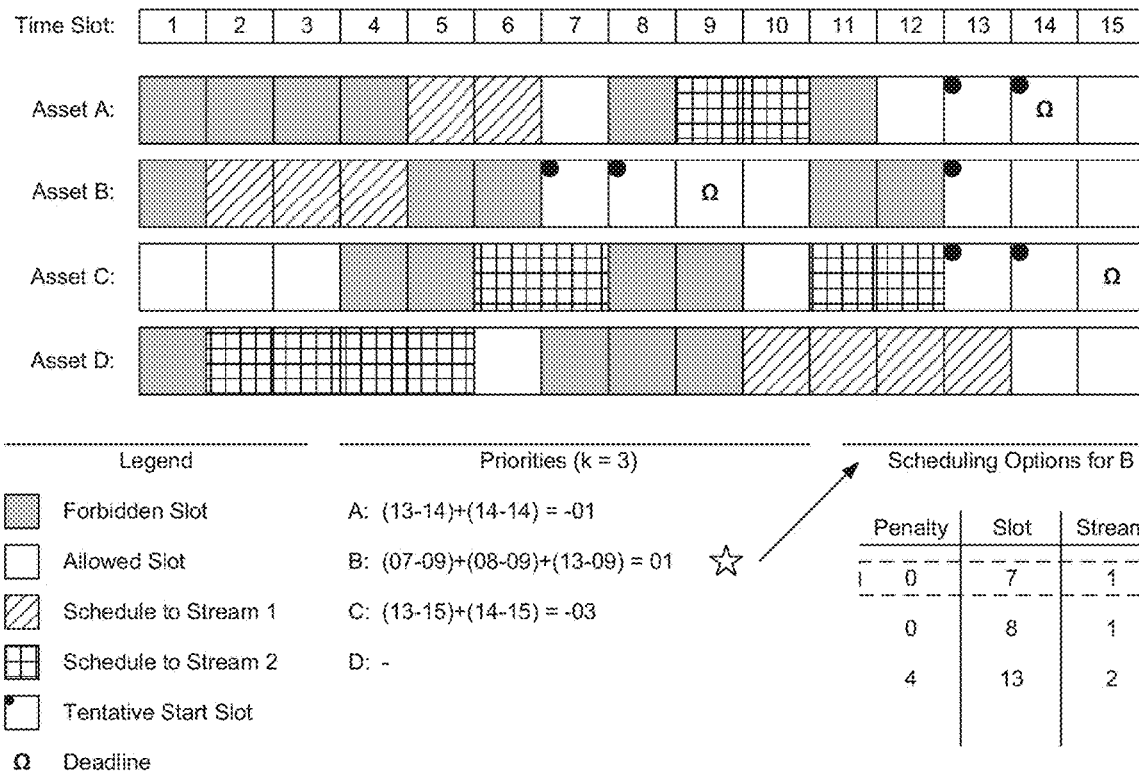
Figure 4N:
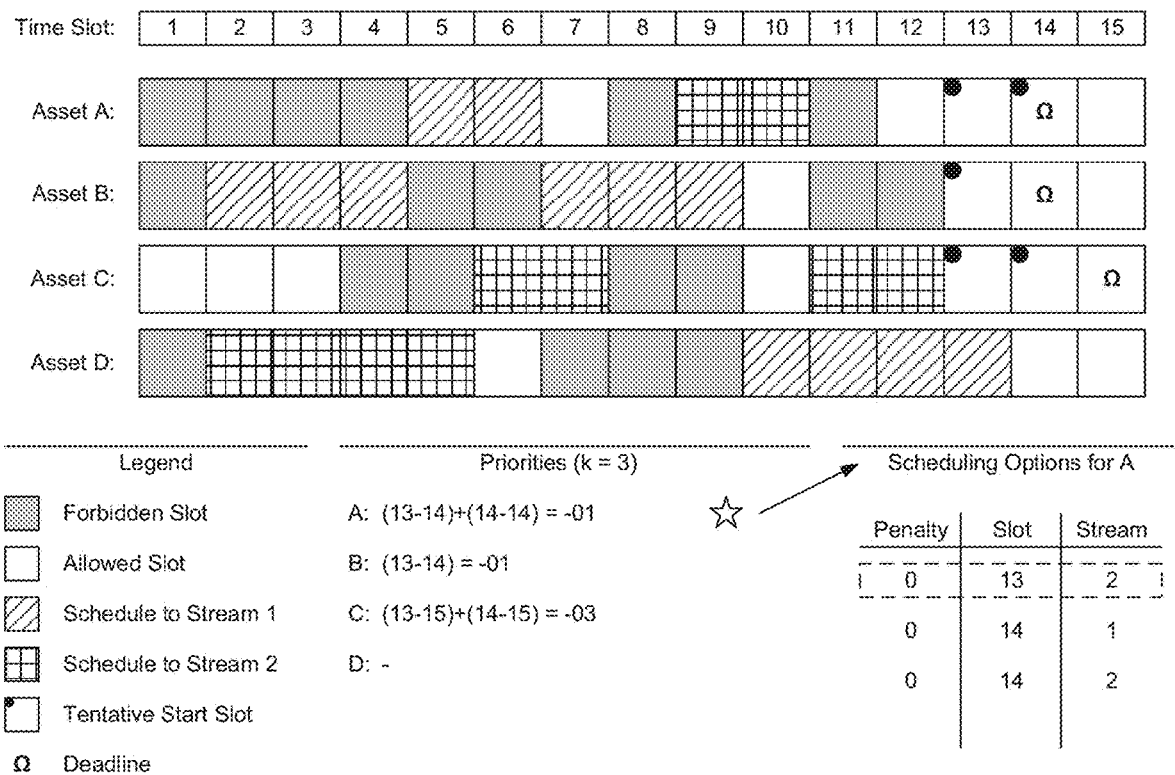
Figure 4O:
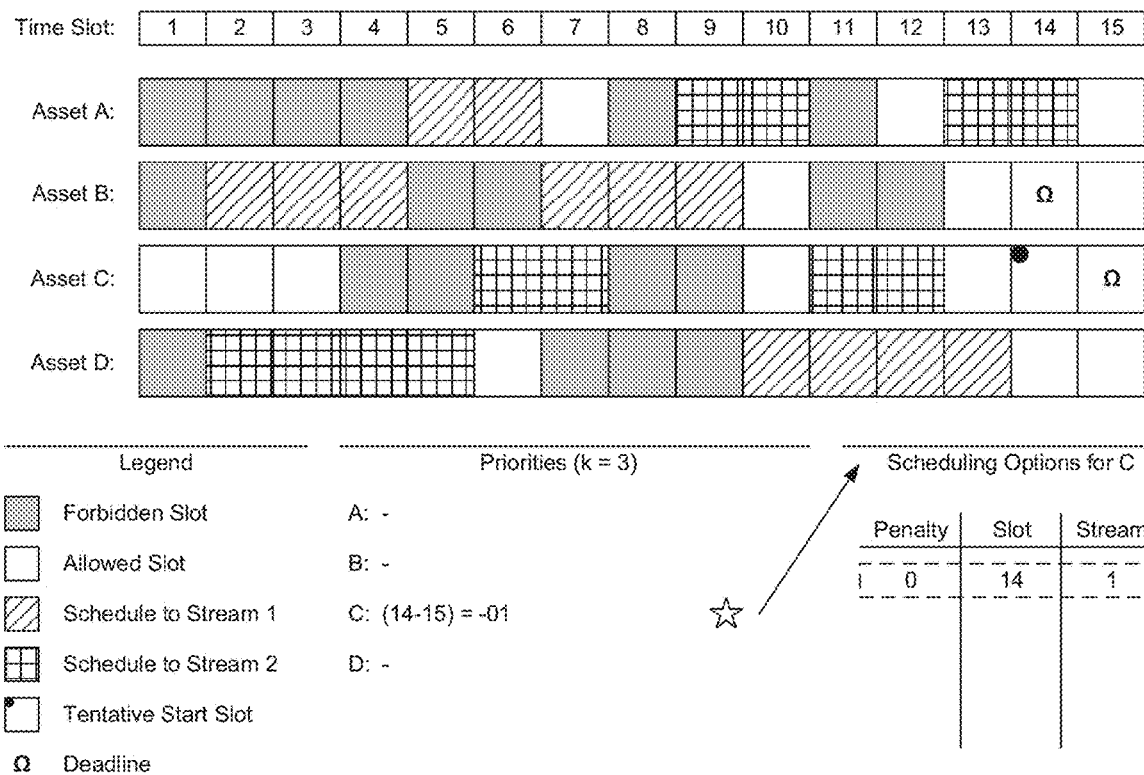
Figure 4P:
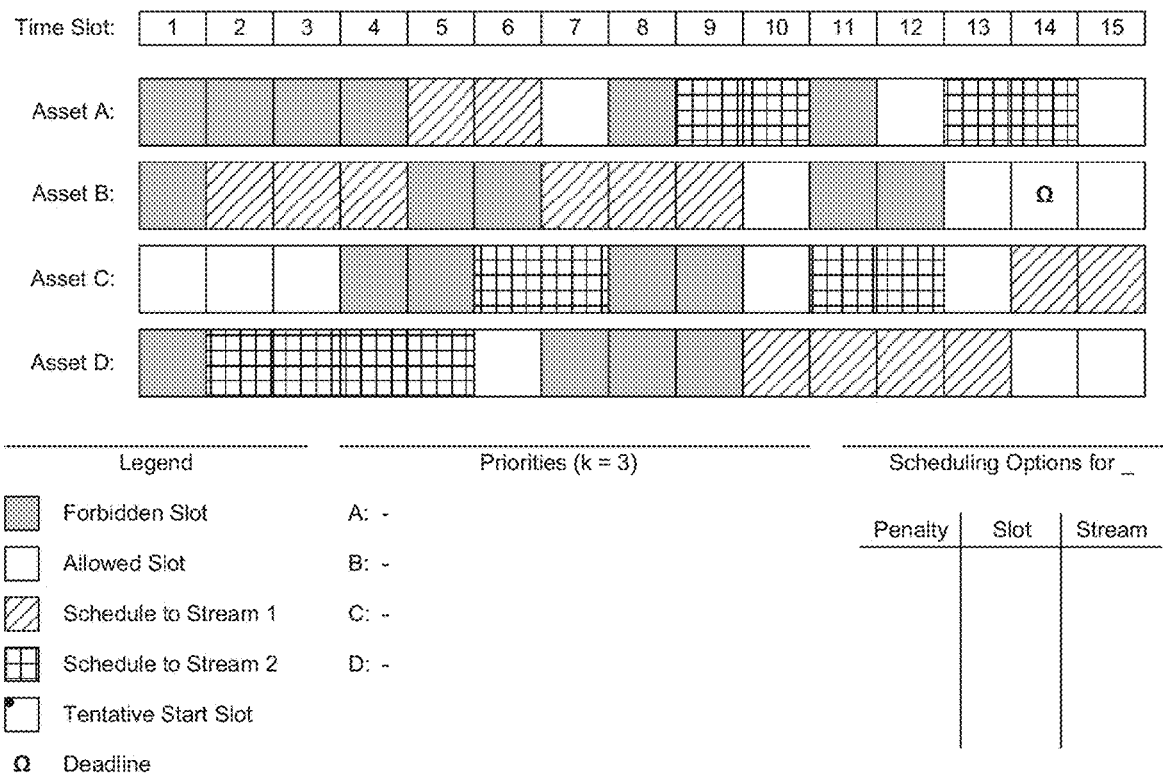

FIGS. 4A-4P show an exemplary scenario in accordance with one or more embodiments of the invention. Specifically, the following exemplary scenario is directed to generating a backup scheduling plan. Further, the following exemplary scenario, presented in conjunction with components shown in FIGS. 4A-4P, is for explanatory purposes only and not intended to limit the scope of the invention.

Turning to FIG. 4A, an exemplary set of assets (402A-402D), assigned to an exemplary backup device (404), is shown. Of the exemplary set of assets, there is: a first asset (402A) associated with an expected backup time of 2 time slots and a next backup period of 5 time slots; a second asset (402B) associated with an expected backup time of 3 time slots and a next backup period of 7 time slots; a third asset (402C) associated with an expected backup time of 2 time slots and a next backup period of 4 time slots; and a fourth asset (402D) associated with an expected backup time of 4 time slots and a next backup period of 6 time slots. Recall that the expected backup time refers to the length of time needed to complete a backup operation targeting a given asset, whereas the next backup period refers to the maximum length of time allowed between backup operations targeting the given asset. Note that an asset criticality of the assets is not considered throughout the exemplary scenario. With respect to the exemplary backup device (404), the maximum number of incoming asset data streams (i.e., 2), which the exemplary backup device (404) can handle is considered.

Turning to FIG. 4B, an empty backup scheduling plan (top) is illustrated, along with a legend (bottom-left), an empty backup priorities data structure (bottom-center), and an empty backup scheduling options data structure (bottom-right). The legend discloses the spectrum of possible symbols that may be used throughout the backup scheduling plan. These possible symbols, from top to bottom, include: a shaded box representative of forbidden time slots; an unshaded box representative of allowed time slots; a first patterned box (i.e., parallel, diagonal lines) representative of scheduled backup operations employing a first of the two maximum data streams that the exemplary backup device can handle; a second patterned box (i.e., orthogonal, intersecting lines) representative of scheduling backup operations employing a second of the two maximum data streams that the exemplary backup device can handle; an unshaded, single dotted box representative of tentative start time slots; and the Greek omega symbol representative of deadlines. Further, in this exemplary scenario, the fixed backup window (or span of the backup scheduling plan) is set for 15 time slots. The actual span of time (e.g., minutes, hours, days, etc.) representative of each time slot may be configured by and known to a datacenter administrator. Moreover, derivation of the backup priorities for the four exemplary assets (402A-402D) may be contingent on the next 3 (i.e., k=3) tentative start time slots (not shown yet) for any given asset.

Turning to FIG. 4C, the empty backup scheduling plan (of FIG. 4B) is updated to reflect a set of forbidden time slots, throughout the fixed backup window, for each of the four exemplary assets. Recall that a forbidden time slot may indicate times when performing backup operations targeting an asset is undesirable, such as during peak asset usage times.

Turning to FIG. 4D, the updated backup scheduling plan (of FIG. 4C) is further updated to reflect one or more tentative start time slots, throughout the fixed backup window, for each of the four exemplary assets. A tentative start time slot may mark a possible time that a backup operation may be scheduled for an asset, which may be dependent on the allowed slots available for the asset, as well as the expected backup time for the asset. For example, when considering Asset A (402A), which has an expected backup time of 2 time slots, the possible tentative start time slots (for scheduling a backup operation targeting Asset A and lasting 2 time slots) are: (1) time slot 5; (2) time slot 6; (3) time slot 12; (4) time slot 13; and (5) time slot 14.

Turning to FIG. 4E, the updated backup scheduling plan (of FIG. 4D) is further updated to reflect an initial deadline for each of the four exemplary assets. A deadline may mark the latest time slot by which a backup operation targeting an asset should be completed. Initial deadlines for the four exemplary assets are indicated at time slots 3, 4, 2, and 3, respectively.

Turning to FIG. 4F, following the completed initialization of the backup scheduling plan (of FIG. 4E), backup priorities (bottom-center) for the four exemplary assets are derived. The backup priority for each asset is determined using the mathematical expression disclosed in FIG. 2, above. As a result, the derived backup priorities for Assets A, B, C, and D are 11, 5, 3, and 6, respectively. Thereafter, Asset A is selected as the target asset since Asset A is associated with the highest backup priority and, accordingly, backup scheduling options (bottom-right) for Asset A are identified.

The backup scheduling options include: (a) scheduling a backup operation (targeting Asset A) that would start during time slot 5, would employ the first incoming data stream handled by the exemplary backup device, and is associated with a backup penalty or violation of 2 (i.e., start time slot 5 is 2 time slots beyond deadline time slot 3); (b) scheduling a backup operation (targeting Asset A) that would start during time slot 5, would employ the second incoming data stream handled by the exemplary backup device, and is associated with a backup penalty or violation of 2; (c) a backup operation (targeting Asset A) that would start during time slot 6, would employ the first incoming data stream handled by the exemplary backup device, and is associated with a backup penalty or violation of 3 (i.e., start time slot 6 is 3 time slots beyond deadline time slot 3); and (d) scheduling a backup operation (targeting Asset A) that would start during time slot 6, would employ the second incoming data stream handled by the exemplary backup device, and is associated with a backup penalty or violation of 3.

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option). Note that the second backup scheduling option could have alternatively been chosen as the best-fit backup scheduling option.

Turning to FIG. 4G, the selected best-fit backup scheduling option (for Asset A) is subsequently inserted into the backup scheduling plan—see e.g., time slots 5 and 6 (within the Asset A row) are updated to reflect the scheduling of a backup operation that would employ the first incoming data stream handled by the exemplary backup device. Hereinafter, the deadline for Asset A is updated/moved into time slot 10 (i.e., scheduled backup start time slot 5+Asset A next backup period of 5 time slots), and a new backup priority for Asset A (i.e., 4) is derived based on the updated deadline.

From the backup priorities (including the updated backup priority for Asset A) for the four exemplary assets, Asset D is selected as the new target asset since Asset D is associated with the highest backup priority. Following the selection, backup scheduling options (bottom-right) for Asset D are identified.

The backup scheduling options include: (a) scheduling a backup operation (targeting Asset D) that would start during time slot 2, would employ the second incoming data stream handled by the exemplary backup device, and is associated with a backup penalty or violation of 0 (i.e., start time slot 2 is 0 time slots beyond deadline time slot 3); (b) scheduling a backup operation (targeting Asset D) that would start during time slot 3, would employ the second incoming data stream handled by the exemplary backup device, and is associated with a backup penalty or violation of 0 (i.e., start time slot 3 is 0 time slots beyond deadline time slot 3); (c) a backup operation (targeting Asset D) that would start during time slot 10, would employ the first incoming data stream handled by the exemplary backup device, and is associated with a backup penalty or violation of 7 (i.e., start time slot 10 is 7 time slots beyond deadline time slot 3); and (d) scheduling a backup operation (targeting Asset D) that would start during time slot 10, would employ the second incoming data stream handled by the exemplary backup device, and is associated with a backup penalty or violation of 7.

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option). Note that the second backup scheduling option could have alternatively been chosen as the best-fit backup scheduling option.

Turning to FIG. 4H, the selected best-fit backup scheduling option (for Asset D) is subsequently inserted into the backup scheduling plan—see e.g., time slots 2-5 (within the Asset D row) are updated to reflect the scheduling of a backup operation that would employ the second incoming data stream handled by the exemplary backup device. Hereinafter, the deadline for Asset D is updated/moved into time slot 8 (i.e., scheduled backup start time slot 2+Asset D next backup period of 6 time slots), and a new backup priority for Asset D (i.e., 9) is derived based on the updated deadline.

From the backup priorities (including the updated backup priority for Asset D) for the four exemplary assets, Asset D is again selected as the new target asset since Asset D is associated with the highest backup priority. Following the selection, backup scheduling options (bottom-right) for Asset D are identified.

The backup scheduling options include: (a) scheduling a backup operation (targeting Asset D) that would start during time slot 10, would employ the first incoming data stream handled by the exemplary backup device, and is associated with a backup penalty or violation of 2 (i.e., start time slot 10 is 2 time slots beyond deadline time slot 8); (b) scheduling a backup operation (targeting Asset D) that would start during time slot 10, would employ the second incoming data stream handled by the exemplary backup device, and is associated with a backup penalty or violation of 2; (c) a backup operation (targeting Asset D) that would start during time slot 11, would employ the first incoming data stream handled by the exemplary backup device, and is associated with a backup penalty or violation of 3 (i.e., start time slot 11 is 3 time slots beyond deadline time slot 8); and (d) scheduling a backup operation (targeting Asset D) that would start during time slot 11, would employ the second incoming data stream handled by the exemplary backup device, and is associated with a backup penalty or violation of 3.

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option). Note that the second backup scheduling option could have alternatively been chosen as the best-fit backup scheduling option.

Turning to FIG. 4I, the selected best-fit backup scheduling option (for Asset D) is subsequently inserted into the backup scheduling plan—see e.g., time slots 10-13 (within the Asset D row) are updated to reflect the scheduling of a backup operation that would employ the first incoming data stream handled by the exemplary backup device. Hereinafter, the deadline for Asset D is updated/moved into a time slot beyond the fixed backup window (i.e., scheduled backup start time slot 10+Asset D next backup period of 6 time slots) and, accordingly, based on the updated deadline, the backup priority entry for Asset D is removed.

From the backup priorities for the remaining three exemplary assets, Asset B is selected as the new target asset since Asset B is associated with the highest backup priority. Following the selection, backup scheduling options (bottom-right) for Asset B are identified.

The backup scheduling options include: (a) scheduling a backup operation (targeting Asset B) that would start during time slot 2, would employ the first incoming data stream handled by the exemplary backup device, and is associated with a backup penalty or violation of 0 (i.e., start time slot 2 is 0 time slots beyond deadline time slot 4); (b) scheduling a backup operation (targeting Asset B) that would start during time slot 7, would employ the first incoming data stream handled by the exemplary backup device, and is associated with a backup penalty or violation of 3 (i.e., start time slot 7 is 3 time slots beyond deadline time slot 4); (c) a backup operation (targeting Asset B) that would start during time slot 7, would employ the second incoming data stream handled by the exemplary backup device, and is associated with a backup penalty or violation of 3; and (d) scheduling a backup operation (targeting Asset B) that would start during time slot 8, would employ the second incoming data stream handled by the exemplary backup device, and is associated with a backup penalty or violation of 4 (i.e., start time slot 8 is 4 time slots beyond deadline time slot 4).

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option).

Turning to FIG. 4J, the selected best-fit backup scheduling option (for Asset B) is subsequently inserted into the backup scheduling plan—see e.g., time slots 2-4 (within the Asset B row) are updated to reflect the scheduling of a backup operation that would employ the first incoming data stream handled by the exemplary backup device. Hereinafter, the deadline for Asset B is updated/moved into time slot 9 (i.e., scheduled backup start time slot 2+Asset B next backup period of 7 time slots), and a new backup priority for Asset B (i.e., 1) is derived based on the updated deadline.

From the backup priorities (including the updated backup priority for Asset B) for the remaining three exemplary assets, Asset A is selected as the new target asset since Asset A is associated with the highest backup priority. Following the selection, backup scheduling options (bottom-right) for Asset A are identified.

The backup scheduling options include: (a) scheduling a backup operation (targeting Asset A) that would start during time slot 9, would employ the second incoming data stream handled by the exemplary backup device, and is associated with a backup penalty or violation of 0 (i.e., start time slot 9 is 0 time slots beyond deadline time slot 10); (b) scheduling a backup operation (targeting Asset A) that would start during time slot 12, would employ the second incoming data stream handled by the exemplary backup device, and is associated with a backup penalty or violation of 3 (i.e., start time slot 12 is 3 time slots beyond deadline time slot 9); (c) a backup operation (targeting Asset A) that would start during time slot 13, would employ the second incoming data stream handled by the exemplary backup device, and is associated with a backup penalty or violation of 4 (i.e., start time slot 13 is 4 time slots beyond deadline time slot 9); and (d) scheduling a backup operation (targeting Asset A) that would start during time slot 14, would employ the first incoming data stream handled by the exemplary backup device, and is associated with a backup penalty or violation of 5 (i.e., start time slot 14 is 5 time slots beyond deadline time slot 9).

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option).

Turning to FIG. 4K, the selected best-fit backup scheduling option (for Asset A) is subsequently inserted into the backup scheduling plan—see e.g., time slots 9 and 10 (within the Asset A row) are updated to reflect the scheduling of a backup operation that would employ the second incoming data stream handled by the exemplary backup device. Hereinafter, the deadline for Asset A is updated/moved into time slot 14 (i.e., scheduled backup start time slot 9+Asset A next backup period of 5 time slots), and a new backup priority for Asset A (i.e., −3) is derived based on the updated deadline. Further, tentative start time slots 1 and 2 are removed as backup scheduling possibilities for Asset C since none of the 2 incoming data streams (handled by the exemplary backup device) would be available to enable a potential backup operation for Asset C during at least time slots 2 and 3. Based on these aforementioned removals, a new backup priority for Asset C (i.e., 40) is subsequently derived.

From the backup priorities (including the updated backup priorities for Assets A and C) for the remaining three exemplary assets, Asset C is selected as the new target asset since Asset C is associated with the highest backup priority. Following the selection, backup scheduling options (bottom-right) for Asset C are identified.

The backup scheduling options include: (a) scheduling a backup operation (targeting Asset C) that would start during time slot 6, would employ the second incoming data stream handled by the exemplary backup device, and is associated with a backup penalty or violation of 4 (i.e., start time slot 6 is 4 time slots beyond deadline time slot 2); (b) scheduling a backup operation (targeting Asset C) that would start during time slot 11, would employ the second incoming data stream handled by the exemplary backup device, and is associated with a backup penalty or violation of 9 (i.e., start time slot 11 is 9 time slots beyond deadline time slot 2); (c) a backup operation (targeting Asset C) that would start during time slot 12, would employ the second incoming data stream handled by the exemplary backup device, and is associated with a backup penalty or violation of 10 (i.e., start time slot 12 is 10 time slots beyond deadline time slot 2); and (d) scheduling a backup operation (targeting Asset C) that would start during time slot 13, would employ the second incoming data stream handled by the exemplary backup device, and is associated with a backup penalty or violation of 11 (i.e., start time slot 13 is 11 time slots beyond deadline time slot 2).

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option).

Turning to FIG. 4L, the selected best-fit backup scheduling option (for Asset C) is subsequently inserted into the backup scheduling plan—see e.g., time slots 6 and 7 (within the Asset C row) are updated to reflect the scheduling of a backup operation that would employ the second incoming data stream handled by the exemplary backup device. Hereinafter, the deadline for Asset C is updated/moved into time slot 10 (i.e., scheduled backup start time slot 6+Asset C next backup period of 4 time slots), and a new backup priority for Asset C (i.e., 6) is derived based on the updated deadline.

From the backup priorities (including the updated backup priority for Asset C) for the remaining three exemplary assets, Asset C is again selected as the new target asset since Asset C is associated with the highest backup priority. Following the selection, backup scheduling options (bottom-right) for Asset C are identified.

The backup scheduling options include: (a) scheduling a backup operation (targeting Asset C) that would start during time slot 11, would employ the second incoming data stream handled by the exemplary backup device, and is associated with a backup penalty or violation of 1 (i.e., start time slot 11 is 1 time slot beyond deadline time slot 10); (b) scheduling a backup operation (targeting Asset C) that would start during time slot 12, would employ the second incoming data stream handled by the exemplary backup device, and is associated with a backup penalty or violation of 2 (i.e., start time slot 12 is 2 time slots beyond deadline time slot 10); (c) a backup operation (targeting Asset C) that would start during time slot 13, would employ the second incoming data stream handled by the exemplary backup device, and is associated with a backup penalty or violation of 3 (i.e., start time slot 13 is 3 time slots beyond deadline time slot 10); and (d) scheduling a backup operation (targeting Asset C) that would start during time slot 14, would employ the second incoming data stream handled by the exemplary backup device, and is associated with a backup penalty or violation of 4 (i.e., start time slot 14 is 4 time slots beyond deadline time slot 10).

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option).

Turning to FIG. 4M, the selected best-fit backup scheduling option (for Asset C) is subsequently inserted into the backup scheduling plan—see e.g., time slots 11 and 12 (within the Asset C row) are updated to reflect the scheduling of a backup operation that would employ the second incoming data stream handled by the exemplary backup device. Hereinafter, the deadline for Asset C is updated/moved into time slot 15 (i.e., scheduled backup start time slot 11+Asset C next backup period of 4 time slots), and a new backup priority for Asset C (i.e., −3) is derived based on the updated deadline.

From the backup priorities (including the updated backup priority for Asset C) for the remaining three exemplary assets, Asset B is selected as the new target asset since Asset B is associated with the highest backup priority. Following the selection, backup scheduling options (bottom-right) for Asset B are identified.

The backup scheduling options include: (a) scheduling a backup operation (targeting Asset B) that would start during time slot 7, would employ the first incoming data stream handled by the exemplary backup device, and is associated with a backup penalty or violation of 0 (i.e., start time slot 7 is 0 time slots beyond deadline time slot 9); (b) scheduling a backup operation (targeting Asset B) that would start during time slot 8, would employ the first incoming data stream handled by the exemplary backup device, and is associated with a backup penalty or violation of 0 (i.e., start time slot 8 is 0 time slots beyond deadline time slot 9); and (c) scheduling a backup operation (targeting Asset B) that would start during time slot 13, would employ the second incoming data stream handled by the exemplary backup device, and is associated with a backup penalty or violation of 4 (i.e., start time slot 13 is 4 time slots beyond deadline time slot 9).

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option). Note that the second backup scheduling option could have alternatively been chosen as the best-fit backup scheduling option.

Turning to FIG. 4N, the selected best-fit backup scheduling option (for Asset B) is subsequently inserted into the backup scheduling plan—see e.g., time slots 7-9 (within the Asset B row) are updated to reflect the scheduling of a backup operation that would employ the first incoming data stream handled by the exemplary backup device. Hereinafter, the deadline for Asset B is updated/moved into time slot 14 (i.e., scheduled backup start time slot 7+Asset B next backup period of 7 time slots), and a new backup priority for Asset B (i.e., −1) is derived based on the updated deadline.

From the backup priorities (including the updated backup priority for Asset B) for the remaining three exemplary assets, Asset A is selected as the new target asset since Asset A is associated with the highest backup priority. Following the selection, backup scheduling options (bottom-right) for Asset A are identified.

The backup scheduling options include: (a) scheduling a backup operation (targeting Asset A) that would start during time slot 13, would employ the second incoming data stream handled by the exemplary backup device, and is associated with a backup penalty or violation of 0 (i.e., start time slot 13 is 0 time slots beyond deadline time slot 14); (b) scheduling a backup operation (targeting Asset A) that would start during time slot 14, would employ the first incoming data stream handled by the exemplary backup device, and is associated with a backup penalty or violation of 0 (i.e., start time slot 14 is 0 time slots beyond deadline time slot 14); and (c) scheduling a backup operation (targeting Asset A) that would start during time slot 14, would employ the second incoming data stream handled by the exemplary backup device, and is associated with a backup penalty or violation of 0.

From the above-mentioned backup scheduling options, the first backup scheduling option is selected as the best-fit backup scheduling option. Selection of the best-fit backup scheduling option may depend on the associated backup penalty or violation (where the least penalty/violation is desirable) and the presence of any scheduling conflicts (e.g., employed incoming data stream already in use by another previously scheduled backup operation for any asset during the proposed time slots of the backup scheduling option). Note that either the second or third backup scheduling option could have alternatively been chosen as the best-fit backup scheduling option.

Turning to FIG. 4O, the selected best-fit backup scheduling option (for Asset A) is subsequently inserted into the backup scheduling plan—see e.g., time slots 13 and 14 (within the Asset A row) are updated to reflect the scheduling of a backup operation that would employ the second incoming data stream handled by the exemplary backup device. Hereinafter, the deadline for Asset A is updated/moved into a time slot beyond the fixed backup window (i.e., scheduled backup start time slot 13+Asset A next backup period of 5 time slots) and, accordingly, based on the updated deadline, the backup priority entry for Asset A is removed. Further, tentative start time slot 13 is removed as a backup scheduling possibility for Asset B since none of the 2 incoming data streams (handled by the exemplary backup device) would be available to enable a potential backup operation for Asset B during time slots 13-15. Based on the aforementioned, zero tentative start time slots for Asset B remain and, accordingly, the backup priority entry for Asset B is also removed.

Since the backup priority entry for Asset C is the only remaining backup priority entry, Asset C is selected as the new target asset. Following the selection, backup scheduling options (bottom-right) for Asset C are identified.

The backup scheduling options include: (a) scheduling a backup operation (targeting Asset C) that would start during time slot 14, would employ the first incoming data stream handled by the exemplary backup device, and is associated with a backup penalty or violation of 0 (i.e., start time slot 14 is 0 time slots beyond deadline time slot 14). With only one backup scheduling option presented, the sole backup scheduling option is selected as the best-fit backup scheduling option.

Turning to FIG. 4P, the selected best-fit backup scheduling option (for Asset C) is subsequently inserted into the backup scheduling plan—see e.g., time slots 14 and 15 (within the Asset C row) are updated to reflect the scheduling of a backup operation that would employ the first incoming data stream handled by the exemplary backup device. Hereinafter, the deadline for Asset C is updated/moved into a time slot beyond the fixed backup window (i.e., scheduled backup start time slot 14+Asset C next backup period of 4 time slots) and, accordingly, based on the updated deadline, the backup priority entry for Asset C is removed. At this point, with zero backup priority entries remaining, the generation process of the backup scheduling plan halts; and the final backup plan (or respective parts thereof) is provided to the four exemplary assets for implementation. These respective portions of the final backup plan, which may be distributed to the four exemplary assets, may take form, for example, through one or more scheduling information tuples each specifying a start time slot and a stream identifier. An exemplary list of these tuples, provided to the appropriate exemplary asset, is shown below.

| Scheduling Information Tuples Distributed Per Asset | | | |
| --- | --- | --- | --- |
| Asset A | Asset B | Asset C | Asset D |
| (5, 1) | (2, 1) | (6, 2) | (2, 2) |
| (9, 2) | (7, 1) | (11, 2) | (10, 1) |
| (13, 2) | | (14, 1) | |

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating asset backup scheduling plans, comprising:

selecting a backup device;
identifying a set of assets assigned to the backup device;
initializing a backup scheduling plan using scheduling state for each asset in the set of assets;
generating a backup priority list comprising a number of entries matching a cardinality of the set of assets;
while the backup priority list comprises at least one entry, performing an iterative process, comprising:
  selecting, from at least a subset of the set of assets represented in the at least one entry, a target asset based on at least one backup priority specified in the backup priority list;
  identifying a set of backup scheduling options for the target asset;
  selecting, for the target asset, a best-fit backup scheduling option from the set of backup scheduling options;
  inserting the best-fit backup scheduling option for the target asset into, in order to update, the backup scheduling plan; and
  updating the backup priority list.

2. The method of claim 1, wherein the scheduling state for an asset of the set of assets comprises a set of forbidden time slots associated with the asset, an expected backup time for completing a backup operation targeting the asset, a next backup period specifying a maximum number of time slots between backup operations targeting the asset, and a deadline for triggering the backup operation targeting the asset.

3. The method of claim 2, wherein the backup scheduling plan is further initialized using a set of tentative start time slots associated with each asset in the set of assets, wherein the set of tentative start time slots for the asset is determined using a set of available time slots associated with the asset and the expected backup time for completing the backup operation targeting the asset.

4. The method of claim 1, wherein the target asset is associated with a highest backup priority amongst the at least one backup priority specified in the at least one entry of the backup priority list.

5. The method of claim 1, wherein each backup scheduling option in the set of backup scheduling options for the target asset is defined using a start time slot, a stream identifier associated with one of an at least one incoming data stream available on the backup device, and a backup penalty.

6. The method of claim 5, wherein selection of the best-fit backup scheduling option is at least based on a lowest value of the backup penalty.

7. The method of claim 6, wherein selection of the best-fit backup scheduling option is further based on a latest start time slot should a plurality of backup scheduling options in the set of backup scheduling options be defined, at least in part, by the lowest value of the backup penalty.

8. The method of claim 1, wherein updating the backup priority list, comprises:
  moving a deadline for triggering a backup operation targeting the target asset from a previous time slot within the backup scheduling plan to a new time slot; and
  modifying, based on the new time slot of the deadline, an entry representative of the target asset in the backup priority list,
  wherein modifying the entry is one selected from a group consisting of updating a backup priority for the target asset specified in the entry and removing the entry from the backup priority list.

9. The method of claim 8, wherein the new time slot for the deadline is positioned relative to a start time slot of the best-fit backup scheduling option and based on a next backup period associated with the target asset.

10. The method of claim 1, further comprising:
after updating the backup priority list:
  making a determination that the backup priority list comprises zero entries;
  halting, based on the determination, the iterative process; and
  providing the backup scheduling plan to the set of assets for implementation.

11. A non-transitory computer readable medium (CRM) comprising computer readable program code, which when executed by a computer processor, enables the computer processor to:
select a backup device;
identify a set of assets assigned to the backup device;
initialize a backup scheduling plan using scheduling state for each asset in the set of assets;
generate a backup priority list comprising a number of entries matching a cardinality of the set of assets;
while the backup priority list comprises at least one entry, perform an iterative process, comprising:
  selecting, from at least a subset of the set of assets represented in the at least one entry, a target asset based on at least one backup priority specified in the backup priority list;
  identifying a set of backup scheduling options for the target asset;
  selecting, for the target asset, a best-fit backup scheduling option from the set of backup scheduling options;
  inserting the best-fit backup scheduling option for the target asset into, in order to update, the backup scheduling plan; and
  updating the backup priority list.

12. The non-transitory CRM of claim 11, wherein the scheduling state for an asset of the set of assets comprises a set of forbidden time slots associated with the asset, an expected backup time for completing a backup operation targeting the asset, a next backup period specifying a maximum number of time slots between backup operations targeting the asset, and a deadline for triggering the backup operation targeting the asset.

13. The non-transitory CRM of claim 12, wherein the backup scheduling plan is further initialized using a set of tentative start time slots associated with each asset in the set of assets, wherein the set of tentative start time slots for the asset is determined using a set of available time slots associated with the asset and the expected backup time for completing the backup operation targeting the asset.

14. The non-transitory CRM of claim 11, wherein the target asset is associated with a highest backup priority amongst the at least one backup priority specified in the at least one entry of the backup priority list.

15. The non-transitory CRM of claim 11, wherein each backup scheduling option in the set of backup scheduling options for the target asset is defined using a start time slot, a stream identifier associated with one of an at least one incoming data stream available on the backup device, and a backup penalty.

16. The non-transitory CRM of claim 15, wherein selection of the best-fit backup scheduling option is at least based on a lowest value of the backup penalty.

17. The non-transitory CRM of claim 16, wherein selection of the best-fit backup scheduling option is further based on a latest start time slot should a plurality of backup scheduling options in the set of backup scheduling options be defined, at least in part, by the lowest value of the backup penalty.

18. The non-transitory CRM of claim 11, comprising computer readable program code to update the backup priority list, which when executed by the computer processor, enables the computer processor to:
- move a deadline for triggering a backup operation targeting the target asset from a previous time slot within the backup scheduling plan to a new time slot; and
- modify, based on the new time slot of the deadline, an entry representative of the target asset in the backup priority list,
- wherein modifying the entry is one selected from a group consisting of updating a backup priority for the target asset specified in the entry and removing the entry from the backup priority list.

19. The non-transitory CRM of claim 18, wherein the new time slot for the deadline is positioned relative to a start time slot of the best-fit backup scheduling option and based on a next backup period associated with the target asset.

20. The non-transitory CRM of claim 11, further comprising computer readable program code, which when executed by the computer processor, further enables the computer processor to:
- after updating the backup priority list:
    - make a determination that the backup priority list comprises zero entries;
    - halt, based on the determination, the iterative process; and
    - provide the backup scheduling plan to the set of assets for implementation.

\* \* \* \* \*